US 12,333,690 B2

(12) United States Patent
Xu et al.

(10) Patent No.: US 12,333,690 B2
(45) Date of Patent: Jun. 17, 2025

(54) METHOD AND DEVICE FOR REMOVING HANDWRITTEN CONTENT FROM TEXT IMAGE, AND STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 461 days.

(21) Appl. No.: 17/915,488

(22) PCT Filed: Feb. 9, 2021

(86) PCT No.: PCT/CN2021/076250
§ 371 (c)(1),
(2) Date: Sep. 29, 2022

(87) PCT Pub. No.: WO2021/203832
PCT Pub. Date: Oct. 14, 2021

(65) Prior Publication Data
US 2023/0222631 A1    Jul. 13, 2023

(30) Foreign Application Priority Data
Apr. 10, 2020    (CN) .......................... 202010278143.4

(51) Int. Cl.
*G06T 5/00*    (2024.01)
*G06T 5/70*    (2024.01)
(Continued)

(52) U.S. Cl.
CPC ................. *G06T 5/77* (2024.01); *G06T 5/70* (2024.01); *G06T 7/11* (2017.01); *G06T 7/13* (2017.01); *G06V 10/28* (2022.01)

(58) Field of Classification Search
CPC .. G06N 20/00; G06N 3/02; G06T 7/11; G06T 2207/30176; G06T 5/77;
(Continued)

(56) References Cited

U.S. PATENT DOCUMENTS 5,631,984 A * 5/1997 Graf ..................... H04N 1/4115
                                                                382/317
8,385,811 B1 * 2/2013 Gedlinske ................ G09B 7/06
                                                                434/323
(Continued)

FOREIGN PATENT DOCUMENTS

CN    102521516    6/2012
CN    105898322    8/2016
(Continued)

OTHER PUBLICATIONS

Nagabhushan, P., et al. "Automatic removal of handwritten annotations from between-text-lines and inside-text-line regions of a printed text document." Procedia Computer Science 45 (2015): 205-214.*

(Continued)

*Primary Examiner* — Li Liu
(74) *Attorney, Agent, or Firm* — JCIPRNET

(57) ABSTRACT

Provided by the present disclosure are a method and device for removing handwritten content from a text image, and a storage medium. The method for removing handwritten content from a text image comprises: acquiring an input image of a text page to be processed, wherein the input image comprises a handwritten area, and the handwritten area comprises the handwritten content; using an image segmentation model to recognize the input image so as to obtain an initial handwritten pixel of the handwritten content; performing blurring processing on the initial handwritten pixel to obtain a handwritten pixel mask area; determining the handwritten content according to the handwritten
(Continued)

pixel mask area; and removing the handwritten content from the input image to obtain an output image.

12 Claims, 5 Drawing Sheets

(51) Int. Cl.
*G06T 5/77* (2024.01)
*G06T 7/11* (2017.01)
*G06T 7/13* (2017.01)
*G06V 10/28* (2022.01)

(58) Field of Classification Search
CPC .......... G06T 2207/20084; G06V 10/82; G06V 30/2455; G06V 30/19173; G06V 30/412; G06V 10/44; G06V 30/148; G06V 30/147
See application file for complete search history.

(56) References Cited

U.S. PATENT DOCUMENTS

| | | | |
|---|---|---|---|
| 2002/0135786 A1* | 9/2002 | Ma .................... | G06V 30/2455 358/1.1 |
| 2003/0113019 A1* | 6/2003 | Nakagawa ........... | G06V 30/155 382/187 |
| 2019/0066273 A1 | 2/2019 | Frieder et al. | |
| 2021/0056336 A1* | 2/2021 | Ikeda .................... | G06N 3/084 |
| 2021/0067661 A1* | 3/2021 | Nishida ................. | G06V 10/82 |
| 2021/0073514 A1* | 3/2021 | Sangala ................. | G06F 18/22 |
| 2021/0258447 A1* | 8/2021 | Nishida ............... | G06V 30/413 |
| 2023/0037272 A1* | 2/2023 | He ..................... | G06V 30/1801 |

FOREIGN PATENT DOCUMENTS

| | | |
|---|---|---|
| CN | 109254711 | 1/2019 |
| CN | 110533029 | 12/2019 |
| CN | 111275139 | 6/2020 |
| CN | 111488881 | 8/2020 |
| JP | 2002352191 | 12/2002 |
| JP | 2005236843 | 9/2005 |
| JP | 2005276188 | 10/2005 |
| JP | 2006243141 | 9/2006 |

OTHER PUBLICATIONS

"Office Action of China Counterpart Application", issued on Nov. 2, 2022, p. 1-p. 4.
"Office Action of China Counterpart Application", issued on Apr. 26, 2023, p. 1-p. 6.
"Office Action of Japan Counterpart Application", issued on Dec. 12, 2023, p. 1-p. 12.
"International Search Report (Form PCT/ISA/210) of PCT/CN2021/076250," mailed on May 12, 2021, with English translation thereof, pp. 1-4.
"Written Opinion of the International Searching Authority (Form PCT/ISA/237) of PCT/CN2021/076250," mailed on May 13, 2021, pp. 1-6.
"Office Action of China Counterpart Application", issued on Nov. 30, 2021, p. 1-p. 4.
"Office Action of China Counterpart Application", issued on Apr. 15, 2022, p. 1-p. 5.

* cited by examiner

FIG. 2A

METHOD AND DEVICE FOR REMOVING HANDWRITTEN CONTENT FROM TEXT IMAGE, AND STORAGE MEDIUM

CROSS-REFERENCE TO RELATED APPLICATION

This application is a 371 of international application of PCT application serial no. PCT/CN2021/076250, filed on Feb. 9, 2021, which claims the priority benefit of China application no. 202010278143.4, filed on Apr. 10, 2020. The entirety of each of the above mentioned patent applications is hereby incorporated by reference herein and made a part of this specification.

TECHNICAL FIELD

The disclosure relates to a method and a device for removing handwritten content from a text image and a storage medium.

DESCRIPTION OF RELATED ART

Currently, when a user takes a photo of text or scans the text into a photo or PDF and other formats, if the original text already contains the handwritten content left by the current user or other people, such as remarks, descriptions, annotations or symbols and other characters, the handwritten content is also entered into the output image or file simultaneously. When the user does not need the above handwritten content or needs to keep the handwritten content confidential, it is difficult for general users to remove the relevant handwritten content, and it is also inconvenient to save or distribute the content. In addition, the text photos taken by the user through a mobile phone often have shadows in the text photos due to the difference in the photographing environment. If the text photo is printed directly, the printer will directly print out the shadows in the text photos, which results in waste of ink and also makes the content difficult to be read.

SUMMARY

In order to solve the above issue, the present disclosure provides a method for removing handwritten content from a text image, including: acquiring an input image of a text page to be processed, and the input image includes a handwritten area, and the handwritten area includes handwritten content; using an image segmentation model to recognize the input image so as to obtain an initial handwritten pixel of the handwritten content; performing blurring processing on the initial handwritten pixel to obtain a handwritten pixel mask area; determining the handwritten content according to the handwritten pixel mask area; and removing the handwritten content from the input image to obtain an output image.

Optionally, in the method for removing handwritten content from a text image provided by the present disclosure, the step of removing the handwritten content from the input image to obtain an output image includes:

Determining the non-handwritten pixels in the handwritten pixel mask area in the input image according to the pixel value of the initial handwritten pixel and the position of the handwritten pixel mask area; removing the handwritten pixel mask area content from the input image to obtain an intermediate output image;

Performing non-handwritten pixel restoration in the handwritten pixel mask area on the intermediate output image to obtain the output image.

Optionally, in the method for removing handwritten content from a text image provided by the present disclosure, the step of removing the handwritten content from the input image to obtain an output image includes:

Determining the non-handwritten pixel in the handwritten pixel mask area in the input image according to the pixel value of the initial handwritten pixel and the position of the handwritten pixel mask area;

Removing the handwritten content from the input image according to the non-handwritten pixels in the handwritten pixel mask area and the handwritten pixel mask area to obtain the output image.

Optionally, in the method for removing handwritten content from a text image provided by the present disclosure, the step of removing the handwritten content from the input image to obtain an output image includes: segmenting and removing the handwritten content from the input image to obtain an intermediate output image; performing binarization processing on the intermediate output image to obtain the output image.

Optionally, in the method for removing handwritten content from a text image provided by the present disclosure, the step of removing the handwritten content from the input image to obtain the output image includes: acquiring replacement pixels; replacing pixels of the handwritten content with the replacement pixels to remove the handwritten content from the input image to obtain the output image.

Optionally, in the method for removing handwritten content from a text image provided by the present disclosure, the step of replacing pixels of the handwritten content with the replacement pixels to remove the handwritten content from the input image to obtain the output image includes: replacing pixels of the handwritten content with the replacement pixels to remove the handwritten content from the input image to obtain an intermediate output image; performing binarization processing on the intermediate output image to obtain the output image.

Optionally, in the method for removing handwritten content from a text image provided by the present disclosure, the replacement pixels are obtained according to the pixels of the handwritten content processed through an image restoration algorithm based on pixel neighborhood calculation.

Optionally, in the method for removing handwritten content from a text image provided by the present disclosure, the step of obtaining replacement pixels further includes using an area recognition model to recognize the input image to obtain the handwritten area, and the replacement pixels are any pixel in the handwritten area except the pixels of the handwritten content; or, the replacement pixel is an average value of the pixel values of all the pixels in the handwritten area except the pixels of the handwritten content.

Optionally, in the method for removing handwritten content from a text image provided by the present disclosure, the step of acquiring the input image of the text page to be processed includes: acquiring an original image of the text page to be processed, and the original image includes the text area to be processed; performing edge detection on the original image to determine the text area to be processed in the original image; performing rectification processing on the text area to be processed to obtain the input image.

Moreover, the present disclosure further provides a device for removing handwritten content from a text image, including: a memory for non-transitory storage of computer-readable instructions; and a processor for running the computer-readable instructions, and the computer-readable instructions are executed by the processor to execute the method for removing handwritten content from a text image according to any one of the above embodiments.

In addition, the present disclosure further provides a storage medium for non-transitory storage of computer-readable instructions. When the computer-readable instructions are executed by a computer, the method for removing handwritten content from a text image according to any one of the above embodiments may be executed.

BRIEF DESCRIPTION OF THE DRAWINGS

In order to explain the technical solutions of the embodiments of the present disclosure more clearly, the accompanying drawings of the embodiments will be briefly introduced below. Clearly, the drawings in the following description only relate to some embodiments of the present disclosure, rather than limit the present disclosure.

FIG. 2A is a schematic view of an original image provided by an embodiment of the present disclosure.

DESCRIPTION OF THE EMBODIMENTS

Figure 1:
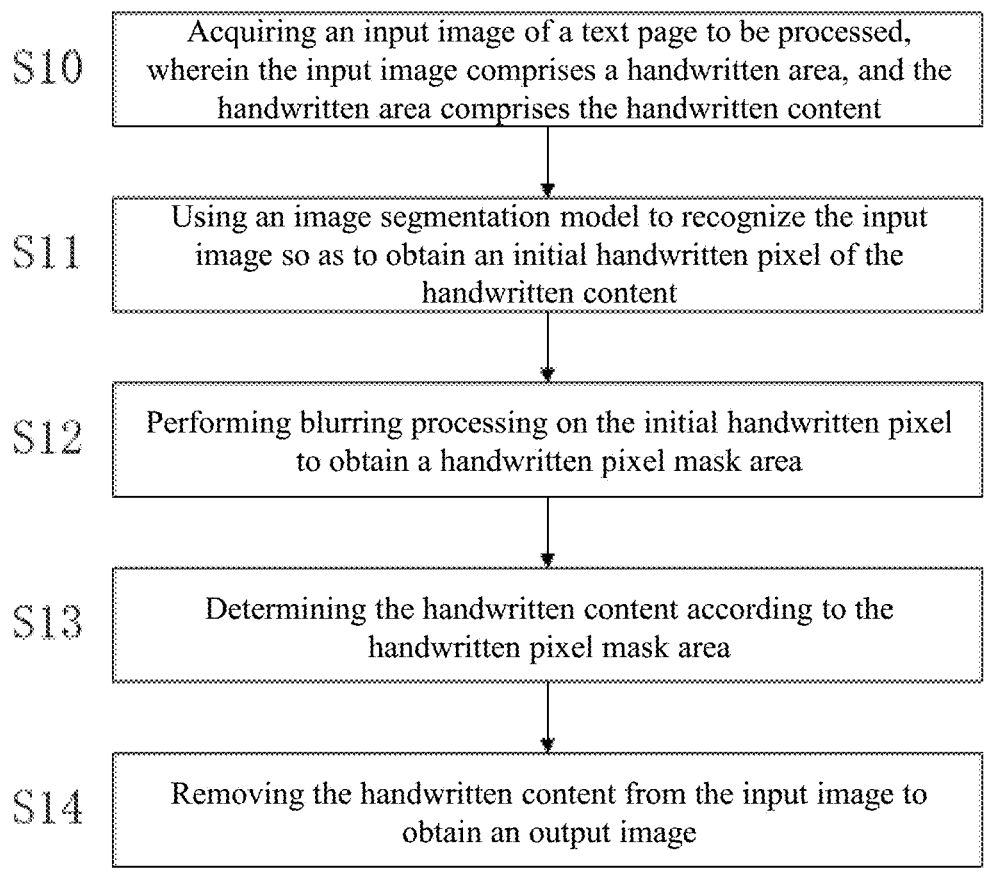
FIG. 1 is a schematic flowchart of a method for removing handwritten content from a text image according to an embodiment of the present disclosure.

In order to make the objectives, technical solutions and advantages of the embodiments of the present disclosure clearer, the technical solutions in the exemplary embodiments of the present disclosure will be clearly and thoroughly described below with reference to the accompanying drawings in the exemplary embodiments of the present disclosure. Clearly, the exemplary embodiments described herein are some, but not all, embodiments of the present disclosure. Based on the described embodiments of the present disclosure, all other embodiments obtained by those of ordinary skill in the art without creative efforts fall within the protection scope of the present disclosure.

Unless otherwise explicitly specified, the technical or scientific terms used in the present disclosure should have the ordinary meanings understood by those with ordinary skill in the art to which the present disclosure belongs. The terms "first" and "second" and the like used in the disclosure should not be construed as indicating any sequence, quantity or importance, and they are only adopted to differentiate different constitutions. "Comprises" or "including" and similar words mean that the elements or things appearing before the word encompass the elements or things recited after the word and their equivalents, but do not exclude other elements or things. Words like "connected" or "linked" are not limited to physical or mechanical connections, but may include electrical connections, whether direct or indirect. "Up", "Down", "Left", "Right", etc. are only used to represent the relative positional relationship. When the absolute position of the described object changes, the relative positional relationship may also change accordingly.

In order to keep the following description of the embodiments of the present disclosure clear and concise, the present disclosure omits a detailed description of some commonly-known functions and commonly-known components.

At least one embodiment of the present disclosure provides a method and a device for removing handwritten content from a text image and storage medium. The method for removing handwritten content from a text image includes: acquiring an input image of a text page to be processed, and the input image includes a handwritten area, and the handwritten area includes handwritten content; using an image segmentation model to recognize the input image to obtain the initial handwritten pixels of the handwritten content; performing blurring processing on the initial handwritten pixel to obtain a handwritten pixel mask area; determining the handwritten content according to the handwritten pixel mask area; and removing the handwritten content from the input image to obtain an output image.

The method for removing handwritten content from a text image may effectively remove the handwritten content from the handwritten area in the input image, so as to output an image or a file that only includes printed content. In addition, the method for removing handwritten content from a text image may also convert the input image into a form that is convenient for printing, so that the user may print the input image in a paper form for saving or distribution.

The embodiments of the present disclosure will be described in detail below with reference to the accompanying drawings, but the present disclosure is not limited to these specific embodiments.

Figure 2A:
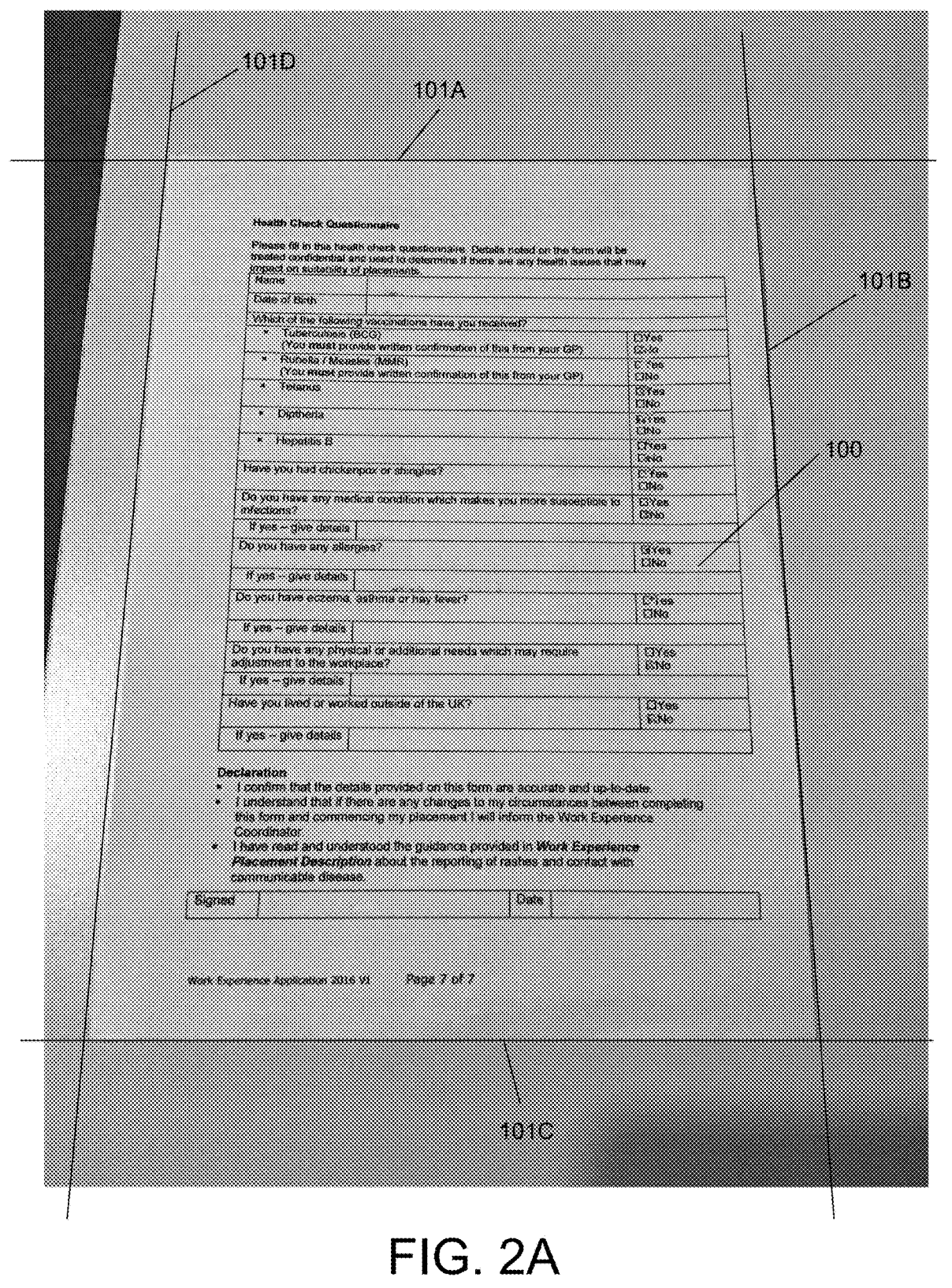
Figure 2B:
FIG. 2B is a schematic view of an output image provided by an embodiment of the present disclosure.

FIG. 1 is a schematic flowchart of a method for removing handwritten content from a text image according to at least one embodiment of the present disclosure. FIG. 2A is a schematic view of an original image provided by at least one embodiment of the present disclosure. FIG. 2B is a schematic view of an output image provided by at least one embodiment of the present disclosure.

For example, as shown in FIG. 1, the method for removing handwritten content from a text image provided by an embodiment of the present disclosure includes steps S10 to S14.

As shown in FIG. 1, first, in step S10 of the method for removing handwritten content from a text image, an input image of a text page to be processed is acquired.

For example, in step S10, the input image includes a handwritten area, and the handwritten area includes handwritten content. The input image may be any image that includes handwritten content.

For example, the input image may be an image captured by an image acquisition device (e.g., a digital camera or a mobile phone, etc.), and the input image may be a grayscale image or a color image. It should be noted that the input image refers to a form in which the text page to be processed is presented in a visual manner, such as a picture of the text page to be processed.

For example, the handwritten area does not have a fixed shape, but is determined according to the handwritten content. That is to say, the area with handwritten content is the handwritten area, and the handwritten area may be a regular shape (for example, a rectangle, etc.), or may be an irregular shape. The handwritten area may include filled areas, handwritten drafts, or other handwritten marked areas, and the like.

For example, the input image further includes a text printing area, and the text printing area includes the printed content. The shape of the text printing area may also be a regular shape (for example, a rectangle, etc.) or an irregular shape. In the embodiment of the present disclosure, it is exemplified in the description that, the present disclosure includes but is not limited thereto, the shape of each handwritten area is a rectangle and the shape of each text printing area is a rectangle.

For example, text pages to be processed may include books, newspapers, journals, documents, forms, contracts, and the like. Books, newspapers and journals include various document pages with articles or graphics, and documents include various invoices, receipts, express orders, etc. The forms can be various types of forms, such as year-end summary form, personnel information form, price summary form, application forms, etc.; contracts can include various forms of contract text pages, etc. The present disclosure does not specifically limit the types of text pages to be processed.

For example, the text page to be processed may be text in paper form or text in electronic form. For example, when the text page to be processed is a document, such as a courier note, the printed content may include the title text of each item, and the handwritten content may include information filled in by the user, such as name, address, phone number, etc. (in this case, the information is personal information filled in by the user but not general information). When the text page to be processed is article text, the printed content may be the article content, and the handwritten content may be the user's remarks or other handwritten marks. When the text page to be processed is a form, such as a personnel information form, the printed content may include title text such as "name", "gender", "ethnicity", "employment history" and other items, and the handwritten content may include handwritten information such as the user's name, gender (male or female), ethnicity, and employment history that the user (e.g., employee, etc.) fills in the personnel information form. The printed content may also include various symbols, graphics, and the like.

For example, the shape of the text page to be processed may be a rectangle or the like, and the shape of the input image may be a regular shape (e.g., a parallelogram, a rectangle, etc.) to facilitate printing. However, the present disclosure is not limited thereto, and in some embodiments, the input image may also be irregularly shaped.

For example, since the image may be deformed when the image acquisition device captures the image, the size of the input image and the size of the text page to be processed are different. However, the present disclosure is not limited thereto. The size of the input image and the size of the text page to be processed may also be same.

For example, the text page to be processed includes printed content and handwritten content, the printed content may be the content obtained by printing, the handwritten content is the content handwritten by the user, and the handwritten content may include handwritten characters.

It should be noted that the "printed content" not only refers to the content such as text, characters, graphics and the like input on the electronic device through the input device. In some embodiments, when the text page to be processed is text such as notes, the content of the notes may also be handwritten by the user. In this case, the printed content is the printed content on a blank notebook page for handwriting, such as horizontal lines.

For example, the printed content may include characters in various languages, such as Chinese (for example, Chinese characters or Pinyin), English, Japanese, French, Korean, etc., in addition, the printed content may also include numbers, various symbols (for example, tick marks, cross and various operation symbols, etc.) and various graphics, etc. The handwritten content may also include characters in various languages, numbers, symbols, and graphics.

For example, in the example shown in FIG. 2A, the text page 100 to be processed is a form, and the area enclosed by four boundary lines (straight lines 101A-101D) represents the text area 100 to be processed corresponding to the text page to be processed. In the text area 100 to be processed, the printing area includes a form area, the printed content may include the text of various items, such as, name, birthday, etc., and the printed content may further include the logo graphic (covered) in the upper right corner of the text area 100 to be processed. The handwritten area includes a handwritten information area, and the handwritten content may include personal information handwritten by the user, such as, the name handwritten by the user, birthday information, health information, tick marks, and the like.

For example, the input image may include multiple handwritten content and multiple printed content. The plurality of handwritten contents are spaced from each other, and the plurality of printed contents are also spaced from each other. For example, part of the handwritten content in the plurality of handwritten contents may be the same (that is, the characters of the handwritten content are the same, but the specific shape of the handwritten content is different); part of the printed content in the plurality of printed contents may also be the same. The present disclosure is not limited thereto, and the plurality of handwritten contents may be different from each other, and the plurality of printed contents may be different from each other.

For example, in some embodiments, step S10 may include: acquiring an original image of the text page to be processed, and the original image includes a text area to be processed; performing edge detection on the original image to determine the text area to be processed in the original image; performing rectification processing on the text area to be processed to obtain the input image.

For example, a neural network or an edge detection algorithm based on OpenCV may be used to perform edge detection on the original image to determine the text area to be processed. For example, OpenCV is an open source computer vision library, and edge detection algorithms based on OpenCV include Sobel, Scarry, Canny, Laplacian, Prewitt, Marr-Hildresh, scharr and other algorithms.

For example, the step of performing edge detection on the original image to determine the text area to be processed in the original image may include: processing the original image to obtain a line drawing of grayscale contours in the original image, and the line drawing includes multiple lines; merging similar lines in the line drawing to obtain multiple initial merged lines, and determining a boundary matrix according to the multiple initial merged lines; merging similar lines in the multiple initial merged lines to obtain a target line, and the unmerged initial merged lines are also used as target lines, thereby obtaining multiple target lines; determining multiple reference boundary lines among the multiple target lines according to the boundary matrix; processing the original image through a pre-trained boundary line area recognition model to obtain a plurality of boundary line areas of the text page to be processed in the original image; for each boundary line area, determining a target boundary line corresponding to the boundary line area among the plurality of reference boundary lines; determining the edge of the text area to be processed in the original image according to the determined multiple target boundary lines.

For example, in some embodiments, the step of processing the original image to obtain a line drawing of grayscale contours in the original image includes: processing the original image through an edge detection algorithm based on OpenCV to obtain a line drawing of grayscale contours in the original image.

For example, the step of merging similar lines in a line drawing to obtain multiple initial merged lines includes: obtaining long lines in the line drawing, and the long lines are lines whose length exceeds a first preset threshold; obtaining multiple groups of first-type lines from the long lines, and the first-type lines include at least two consecutively adjacent long lines, and the included angle between any two adjacent long lines is smaller than a second preset threshold; for each group of first-type lines, merging each long line in the group of first-type lines in sequence to obtain an initial merged line.

For example, the boundary matrix is determined in the following manner: redrawing multiple initially merged lines and unmerged lines in the long lines, corresponding the position information of the pixel points in all the redrawn lines to the matrix of the entire original image, and setting the value at the position of the pixel point of these lines in the matrix of the original image as the first numerical value, and setting the value at the position of the pixel points outside these lines as the second numerical value, thereby forming a boundary matrix.

For example, the step of merging similar lines in the multiple initial merged lines to obtain the target line includes: obtaining multiple groups of second-type lines from the multiple initial merged lines, and the second-type lines include at least two consecutively adjacent initial merged lines, and the angle between any two adjacent initial merged lines is less than a third preset threshold; for each group of second-type lines, merging each initial merged line in the group of second-type lines in sequence to obtain a target line.

For example, the first preset threshold may be a length of 2 pixels, and the second preset threshold and the third preset threshold may be 15 degrees. It should be noted that the first preset threshold, the second preset threshold and the third preset threshold may be set according to actual application requirements.

For example, according to the boundary matrix, the step of determining multiple reference boundary lines among the multiple target lines includes: for each target line, extending the target line, determining a line matrix according to the extended target line, and comparing the line matrix with the boundary matrix, calculating the number of pixel points belonging to the boundary matrix on the extended target line as the score of the target line, that is, the line matrix is compared with the boundary matrix to determine how many pixel points fall into the boundary matrix, that is, to determine how many pixel points in the same position in the two matrices have the same first numerical value, such as 255, so as to calculate the score, and the line matrix and the boundary matrix have the same size; determining multiple reference boundary lines among the multiple target lines according to the score of each target line. It should be noted that the number of target lines with the best score may be multiple. Therefore, according to the score of each target line, multiple target lines with the best score are determined among the multiple target lines as reference boundary lines.

For example, the line matrix is determined in the following manner: redrawing the extended target line or straight line, corresponding the position information of the pixel points in the redrawn line to the matrix of the entire original image, and setting the value of the position of the pixel point of the lines in the matrix of the original image as the first numerical value, and setting the value of the position of the pixel point other than the lines as the second numerical value, thereby forming a line matrix.

For example, for each boundary line area, the step of determining a target boundary line corresponding to the boundary line area from a plurality of reference boundary lines includes: calculating the slope of each reference boundary line; for each boundary line area, using Hough transform to convert the boundary line area into multiple straight lines, and calculating the average slope of the multiple straight lines, then determining whether there is a reference boundary line whose slope matches the average slope among the multiple reference boundary lines; if the result is positive, the reference boundary line is determined as the target boundary line corresponding to the boundary line area; if it is determined that there is no reference boundary line whose slope matches the average slope among the multiple reference boundary lines, then for each straight line converted from the boundary line area, the line matrix formed by straight line is compared with the boundary matrix, and the number of pixel points belonging to the boundary matrix on the straight line is calculated as the score of the straight line; determining the straight line with the best score as the target boundary line corresponding to the boundary line area; and the line matrix is the same size as the boundary matrix. It should be noted that if there are multiple straight lines with the best scores, the first one of the straight lines will be used as the best boundary line according to the sorting algorithm.

For example, the boundary line area recognition model is a neural network based model. The boundary line area recognition model may be established through machine learning training.

For example, after performing edge detection on the original image, multiple target boundary lines (for example, four target boundary lines) may be determined, and the text area to be processed is determined by the multiple target boundary lines. For example, the text area to be processed may be determined according to multiple intersection points of the multiple target boundary lines and the multiple target boundary lines. Every two adjacent target boundary lines intersect each other to obtain an intersection point. Multiple intersection points and multiple target boundary lines together define the area where the text to be processed in the original image is located. For example, in the example shown in FIG. 2A, the text area to be processed may be a text area enclosed by four target boundary lines. The four target boundary lines are all straight lines, and the four target boundary lines are respectively a first target boundary line 101A, a second target boundary line 101B, a third target boundary line 101C and a fourth target boundary line 101D. In addition to the text area to be processed, the original image may further include a non-text area, for example, an area other than the area enclosed by the four boundary lines in FIG. 2A.

For example, in some embodiments, the step of performing rectification processing on the text area to be processed to obtain the input image includes: performing perspective transformation on the text area to be processed to obtain a front view of the text area to be processed, and the front view is the input image. Perspective transformation is a technique of projecting an image to a new viewing plane, also known as projective mapping. Because in the original image obtained by taking the photo, the real shape of the text to be processed has changed in the original image, that is, geometric distortion is generated. As in the original image shown in FIG. 2A, the shape of the text to be processed (i.e., the form) is originally a rectangle, but the shape of the text to be processed in the original image has changed to become an irregular polygon. Therefore, by performing perspective transformation on the text area to be processed in the original image, the text area to be processed may be transformed from an irregular polygon to a rectangle or a parallelogram, that is, the text area to be processed may be rectified, so as to eliminate the influence of geometric distortion and obtain the front view of the text to be processed in the original image. Perspective transformation may process the pixels in the text area to be processed according to spatial projection conversion coordinates to obtain the front view of the text to be processed, which is not repeated here.

It should be noted that, in some other embodiments, the text area to be processed may be directly segmented from the original image instead of being rectified, so as to obtain a separate image of the text area to be processed. The separate image of the text area to be processed is the input image.

For example, the original image may be an image directly acquired by the image acquisition device, or may be an image obtained after preprocessing the image directly acquired by the image acquisition device. The original image can be a grayscale image or a color image. For example, in order to avoid the influence caused by the data quality and data imbalance of the original image on the removal of the handwritten content from the text image, before processing the original image, the method for removing the handwritten content from the text image provided by the embodiment of the present disclosure may further include an operation of preprocessing the original image. Preprocessing operation may eliminate irrelevant information or noise information from the original image, so as to better process the original image. The preprocessing may include, for example, scaling, cropping, gamma correction, image enhancement, or noise reduction filtering on the image directly acquired by the image acquisition device.

It should be noted that in some embodiments, the original image may be used as the input image, in which case, for example, the original image may be directly recognized to determine the handwritten content in the original image; then the handwritten content is removed from the original image to obtain the output image. Or, the original image may be directly recognized to determine the handwritten content in the original image; then the handwritten content is removed from the original image to obtain an intermediate output image. Then edge detection is performed on the intermediate output image to determine the text area to be processed in the intermediate output image. The text area to be processed is subjected to rectification processing to obtain the output image, that is, in some embodiments of the present disclosure, the handwritten content may be removed from the original image first to obtain the intermediate output image, and then edge detection and rectification processing are performed on the intermediate output image.

Next, as shown in FIG. 1, in step S11, the input image is recognized by an image segmentation model to obtain initial handwritten pixels of the handwritten content.

For example, an image segmentation model represents a model for area recognition (or division) of an input image, an image segmentation model is a model implemented using machine learning techniques (e.g., convolutional neural network techniques) and operated, for example, on general-purpose computing devices or special-purpose computing devices. The image segmentation model is a pre-trained model. For example, the neural network applied to the image segmentation model may further achieve the same function by other neural network models such as deep convolutional neural network, mask region convolutional neural network (Mask-RCNN), deep residual network, attention model, etc., which are not specifically limited in the disclosure.

For example, using the image segmentation model to recognize the input image adopts a U-Net model, which is an improved FCN (Fully Convolutional Network) structure, and adopts the concept of FCN for image semantic segmentation, namely the convolution layer and the pooling layer are used for feature extraction, and the deconvolution layer is used to restore the image size. The U-Net network model is a model with better performance for image segmentation. Deep learning is good for solving classification problems. This feature of deep learning is adopted for image segmentation, and its essence is to classify each pixel point in the image. Finally, different categories of points are marked with different channels, which may achieve the effect of classifying and marking the feature information in the target area. The U-Net model may be used to determine the initial handwritten pixels of the handwritten content in the input image. Similarly, other neural network models such as Mask-RCNN may also be used to determine the initial handwritten pixels of the handwritten content.

Next, as shown in FIG. 1, in step S12, blurring processing is performed on the initial handwritten pixel to obtain a handwritten pixel mask area. The input image is recognized through the image segmentation model, and the obtained initial handwritten pixels may not be all handwritten pixels, but the remaining missing handwritten pixels are generally adjacent to the initial handwritten pixels. Therefore, it is necessary to perform blurring processing on the initial handwritten pixels by expanding the handwritten pixel area to obtain the handwritten pixel mask area, and the handwritten pixel mask area basically includes all the handwritten pixels.

For example, Gaussian blurring processing may be performed on the initial handwritten pixels through Gaussian-Blur function of Gaussian filtering based on OpenCV to expand an area of the initial handwritten pixel, thereby obtaining the handwritten pixel mask area. Gaussian filtering is a process of performing a convolution calculation on each point of the input array and the input Gaussian filter template and then forming these results into a filtered output array, which is a process of weighted averaging of the image of the initial handwritten pixels. The value of each pixel point is weighted and averaged by itself and other pixels in its neighborhood. After being processed by Gaussian blurring, the handwritten pixel image becomes blurred, but its area is expanded. For example, any other blurring technology may also be used to blur the initial handwritten pixels, which is not limited in the disclosure.

Next, as shown in FIG. 1, in step S13, the handwritten content is determined according to the handwritten pixel mask area. All handwritten pixels of the handwritten content are basically determined according to the handwritten pixel mask area combined with the initial handwritten pixels, thereby determining the handwritten content.

Next, as shown in FIG. 1, in step S14, the handwritten content is removed from the input image to obtain an output image.

For example, in the first preferred embodiment of the present disclosure, after the handwritten pixel mask area is obtained in step S12, the position of the handwritten pixel mask area in the input image may be determined, and then proceed to the area of the corresponding position in the input image to recognize non-handwritten pixels. According to the pixel value of the initial handwritten pixel, a search is conducted to find other pixels with a large difference in pixel value in the corresponding area of the input image corresponding to the position of the handwritten pixel mask area, and determine the found pixel as a non-handwritten pixel. For example, it is possible to set the threshold value of pixel difference value, and when there are pixels whose pixel difference value is beyond the threshold value range in the area, such pixels are determined as non-handwritten pixels.

Next, the content in the handwritten pixel mask area is removed from the input image to obtain an intermediate output image.

For example, the content of the handwritten pixel mask area may be removed by the inpaint function based on OpenCV. The OpenCV-based inpaint function uses the area neighborhood to restore a selected area in the image, that is, the pixels in the corresponding area in the input image corresponding to the position of the handwritten pixel mask area are restored using the neighborhood pixels, so as to achieve the effect of removing the content of the handwritten pixel mask area from the input image, thereby obtaining the intermediate output image.

Next, restoration is performed on non-handwritten pixels in the handwritten pixel mask area of the intermediate output image to obtain the output image.

For example, the pixel value of the non-handwritten pixel in the handwritten pixel mask area in the input image is obtained, and the pixel at the corresponding position in the intermediate output image is directly replaced, so as to complete the restoration of the non-handwritten pixel at the position, and finally the output image is obtained.

For example, in another preferred embodiment of the present disclosure, after the handwritten pixel mask area is obtained in step S12, the position of the handwritten pixel mask area in the input image may be determined, and then proceed to the area of the corresponding position in the input image to recognize non-handwritten pixels. According to the pixel value of the initial handwritten pixel, a search is conducted to find other pixels with a large difference in pixel value in the corresponding area of the input image corresponding to the position of the handwritten pixel mask area, and determine the found pixel as a non-handwritten pixel. For example, it is possible to set the threshold value of pixel difference value, and when there are pixels whose pixel difference value is beyond the threshold value range in the area, such pixels are determined as non-handwritten pixels.

Next, the handwritten content is removed from the input image according to the non-handwritten pixels in the handwritten pixel mask area and the handwritten pixel mask area to obtain the output image. That is, non-handwritten pixels are excluded from the handwritten pixel mask area, so that other parts of the pixels are removed, so the non-handwritten pixels are retained to prevent them from being removed by mistake, and finally the output image is obtained.

For example, the content of the handwritten pixel mask area, from which non-handwritten pixels are excluded, may be removed by the inpaint function based on OpenCV. The OpenCV-based inpaint function uses the area neighborhood to restore a selected area in the image, that is, other pixels except the non-handwritten pixels in the corresponding area in the input image corresponding to the position of the handwritten pixel mask area are restored using the neighborhood pixels, so as to achieve the effect of removing the content of the handwritten pixel mask area from the input image.

For example, in another preferred embodiment of the present disclosure, the step of removing the handwritten content from the input image to obtain the output image includes: segmenting and removing the handwritten content from the input image to obtain an intermediate output image; performing binarization processing on the intermediate output image to obtain the output image.

Binarization processing is the process of setting the grayscale value of the pixel points on the intermediate output image to 0 or 255, that is, the process of making the entire intermediate output image show a clear black and white effect. Binarization processing may make the amount of data in the intermediate output image to be reduced considerably, so that the contour of the target may be highlighted. The binarization process may convert the intermediate output image into a grayscale image (i.e., the output image) with clear black and white contrast. The converted grayscale image has less noise interference, which may effectively improve the recognition and printing effect of the content in the output image.

For example, after segmenting and removing the handwritten content from the input image, all pixels in the area corresponding to the handwritten content are removed, that is, the pixels in the area corresponding to the handwritten content are cleared from the input image, that is, there are no pixels. When performing binarization processing on the intermediate output image, no processing is performed on the area where the pixels in the intermediate output image are empty; or, when performing binarization processing on the intermediate output image, it is also possible to fill the area where the pixels in the intermediate output image are empty with a grayscale value of 255. In this manner, the processed text image is formed as a whole, and there is no unsightly hollow area of handwritten content.

For example, after the intermediate output image is subjected to binarization processing, the output image is finally obtained, which makes it convenient for the user to print the output image into a paper form. For example, when the input image is a form, the output image may be printed in paper form for other users to fill out.

For example, the method of binarization processing may be a threshold method, and the threshold method includes: setting a binarization threshold, and comparing the pixel value of each pixel in the intermediate output image with the binarization threshold; if a pixel value of a pixel in the intermediate output image is greater than or equal to the binarization threshold, the pixel value of the pixel is set to 255 grayscale; if the pixel value of a pixel in the intermediate output image is less than the binarization threshold, the pixel value of the pixel is set to 0 grayscale, so that the intermediate output image is binarized.

For example, the selection method of the binarization threshold includes the bimodal method, the P-parameter method, the big law (OTSU method), the maximum entropy method, the iterative method and so on.

For example, in some embodiments, performing binarization processing on the intermediate output image includes: acquiring the intermediate output image; performing grayscale processing on the intermediate output image to obtain a grayscale image of the intermediate output image; performing binarization processing on the grayscale image according to a first threshold to obtain a binarized image of the intermediate output image; taking the binarized image as a guide map to perform guide filtering on the grayscale image to obtain a filtered image; determining a high-value pixel point in the filtered image according to a second threshold, and the grayscale value of the high-value pixel point is greater than the second threshold; expanding the grayscale value of the high-value pixel point according to a preset expansion coefficient to obtain an expanded image; sharpening the expanded image to obtain a clear image; adjusting the contrast of the clear image to obtain the output image.

For example, grayscale processing method includes component method, maximum value method, average value method, weighted average method, and the like.

For example, the preset expansion coefficient is 1.2-1.5, e.g., 1.3. The grayscale value of each high-value pixel is multiplied by a preset expansion coefficient to expand the grayscale value of the high-value pixel, thereby obtaining an expanded image with clearer black and white contrast.

For example, the second threshold is the sum of the grayscale mean value of the filtered image and the standard deviation of the grayscale value.

For example, sharpening the expanded image to obtain a clear image includes: using Gaussian filtering to blur the expanded image to obtain a blurred image; mixing the blurred image and the expanded image in proportion according to a preset mixing coefficient to obtain a clear image.

For example, it is assumed that $F_1(i, j)$ is the grayscale value of the pixel point where the expanded image is located at $(i, j)$, $f_2(i, j)$ is the grayscale value of the pixel point where the blurred image is located at $(i, j)$, $f_3(i, j)$ is the grayscale value of the pixel point where the clear image is located at $(i, j)$, $k_1$ is the preset mixing coefficient of the expanded image, $k_2$ is the preset expansion coefficient of the blurred image, then $f_1(i, j)$, $f_2(1, j)$, and $f_3(i, j)$ satisfy the following relationship:

$$f_3(i,j)=k_1 f_1(i,j)+k_2 f_2(i,j)$$

For example, the preset mixing coefficient of the expanded image is 1.5, and the preset mixing coefficient of the blurred image is −0.5.

For example, the step of adjusting the contrast of the clear image includes: adjusting the grayscale value of each pixel of the clear image according to the grayscale mean value of the clear image.

For example, the grayscale value of each pixel of a clear image may be adjusted by the following formula:

$$f'(i,j)=\bar{f}+(f(i,j)-\bar{f})*(1+t)$$

In the formula, f'(i, j) is the grayscale value of the pixel point of the enhanced image at (i, j), $\bar{f}$ is the grayscale mean value of the clear image, f(i,j) is the grayscale value of the pixel point of the clear image at (i, j), and t is the intensity value. For example, the intensity value may be 0.1-0.5, e.g., the intensity value may be 0.2. In practical applications, the intensity value may be selected according to the final black and white enhancement effect to be achieved.

For example, as shown in FIG. 1, step S14 includes: acquiring replacement pixels; and replacing the pixels of the handwritten content with the replacement pixels, so as to remove the handwritten content from the input image to obtain an output image.

For example, the replacement pixels may be adjacent pixels outside the handwritten pixel mask area, i.e., pixels adjacent to the handwritten pixels that need to be replaced currently outside the handwritten pixel mask area. Similarly, the OpenCV-based inpaint function may also be used to directly perform pixel replacement processing.

For example, the handwritten pixel replacement process may also be performed by means of area recognition. First, the handwritten area is obtained through the area recognition model, and the replacement pixel may be the pixel value of any pixel in the handwritten area except the pixels of the handwritten content. Alternatively, the replacement pixel is the average value (e.g., geometric mean) of the pixel values of all pixels in the handwritten area except the pixels of the handwritten content. Alternatively, the replacement pixel value may also be a fixed value, e.g., a 255 grayscale value. It should be noted that, an image segmentation model such as the U-Net model may be used to directly extract any pixel in the handwritten area except the pixel of handwritten content to obtain a replacement pixel. Alternatively, an image segmentation model such as the U-Net model may be used to extract all pixels in the handwritten area except the pixels of the handwritten content, and then obtain the replacement pixel value based on the pixel values of all pixels.

For example, the step of replacing the pixels of the handwritten content with the replacement pixels to remove the handwritten content from the input image to obtain the output image includes: replacing the pixels of the handwritten content with the replacement pixels to remove the handwritten content from the input image to obtain an intermediate output image; performing binarization processing on the intermediate output image to obtain the output image.

It should be noted that, for the description of the area recognition model performing area recognition, binarization processing, etc., reference may be made to the above-mentioned related descriptions, and repetition will not be incorporated.

For example, after the original image shown in FIG. 2A is processed to remove the handwritten content from the text image, the output image shown in FIG. 2B may be obtained, and the output image is a binarized image. As shown in FIG. 2B, in this output image, all handwritten content is removed, resulting in a blank form with no information filled in by the user.

It should be noted that, in the embodiment of the present disclosure, a model (for example, any model such as an area recognition model, an image segmentation model, etc.) is not a mere mathematical model, but a module that can receive input data, perform data processing, and output processing results. The module may be implemented as a software module, a hardware module (such as a hardware neural network) or a combination of software and hardware. In some embodiments, the area recognition model and/or image segmentation model includes code and programs stored in memory. The processor may execute the codes and programs to implement some or all of the functions of the area recognition model and/or image segmentation model as described above. In still other embodiments, the area recognition model and/or the image segmentation model may include a circuit board or a combination of multiple circuit boards for implementing the functions described above. In some embodiments, the circuit board or combination of multiple circuit boards may include: (1) one or more processors; (2) one or more non-transitory computer-readable memories connected to the processor; and (3) firmware executable by the processor and stored in the memory.

It should be understood that, in the embodiment of the present disclosure, before acquiring the input image, the method for removing handwritten content from the text image further includes: a training phase. The training phase includes the process of training the area recognition model and the image segmentation model. It should be noted that the area recognition model and the image segmentation model may be trained separately, or the area recognition model and the image segmentation model may be trained simultaneously.

For example, the area recognition model may be obtained by training the area recognition model to be trained through a first sample image marked with a text printing area (e.g., the number of marked text printing areas is at least one) and a handwritten area (e.g., the number of marked handwritten areas is at least one). For example, the training process of the area recognition model to be trained may include: in the training phase, using a plurality of first sample images marked with the text printing area and the handwritten area to train the area recognition model to be trained to obtain the area recognition model.

For example, the step of using the multiple first sample images to train the area recognition model to be trained includes: acquiring the current first sample image from the multiple first sample images; processing the current first sample image by using the area recognition model to be trained to obtain the training text printing area and the training handwritten area; calculating the first loss value of the area recognition model to be trained by using the first loss function according to the text printing area and the handwritten area marked in the current first sample image as well as the training text printing area and the training handwritten area; modifying the parameters of the area recognition model to be trained according to the first loss value, and when the first loss function satisfies the first predetermined condition, the trained area recognition model is obtained, and when the first loss function does not satisfy the first predetermined condition, the first sample image is input continuously to repeat the above training process.

For example, in one example, the above-mentioned first predetermined condition corresponds to that the loss of the first loss function converges (i.e., the first loss value is no longer significantly reduced) when a certain number of first sample images are input. For example, in another example, the above-mentioned first predetermined condition is that the number of times of training or training period reaches a predetermined number (for example, the predetermined number may be millions).

For example, the image segmentation model may be obtained by training the image segmentation model to be trained by using the second sample image marked with the pixels of the handwritten content. When marking the pixels of the handwritten content in the second sample image, the second sample image may be enlarged to accurately mark all the pixels of the handwritten content. Machine learning is performed based on various handwritten features (e.g., pixel grayscale features, font features, etc.) to build image segmentation models.

For example, the training process of the image segmentation model to be trained may include: in the training phase, using a plurality of second sample images marked with handwritten content pixels to train the image segmentation model to be trained to obtain the image segmentation model.

For example, the step of using the multiple second sample images to train the area recognition model to be trained includes: obtaining the current second sample image from the multiple second sample images; processing the current second sample image by using the image segmentation model to be trained to obtain the training handwritten content pixels; calculating the second loss value of the image segmentation model to be trained by the second loss function according to the handwritten content pixels and the training handwritten content pixels marked in the current second sample image; modifying the parameters of the image segmentation model to be trained according to the second loss value, and when the second loss function satisfies the second predetermined condition, a trained image segmentation model is obtained, and when the second loss function does not satisfy the second predetermined condition, the second sample image is input continuously to repeat the above training process.

For example, in one example, the above-mentioned second predetermined condition corresponds to that the loss of the second loss function converges (i.e., the second loss value is no longer significantly reduced) when a certain number of second sample images are input. For example, in another example, the above-mentioned second predetermined condition is that the number of times of training or training period reaches a predetermined number (for example, the predetermined number may be millions).

Those skilled in the art can understand that the multiple first training sample images and the multiple second training sample images may be the same or different.

Figure 3:
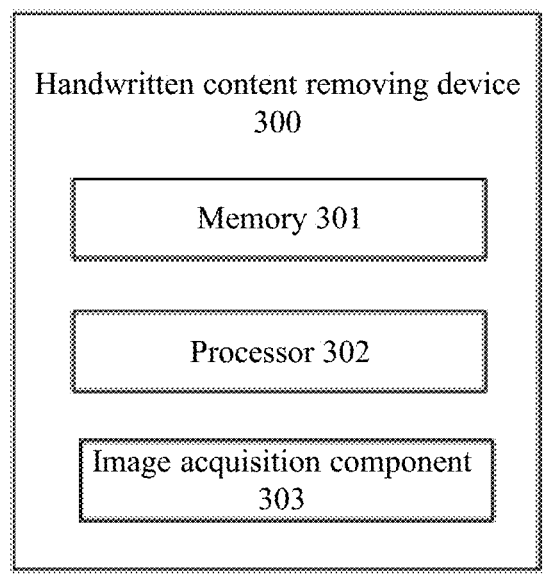
FIG. 3 is a schematic block diagram of a device for removing handwritten content from a text image according to an embodiment of the present disclosure.

At least one embodiment of the present disclosure further provides a device for removing handwritten content from a text image. FIG. 3 is a schematic block diagram of a device for removing handwritten content from a text image provided by at least one embodiment of the present disclosure.

As shown in FIG. 3, the device 300 for removing handwritten content from the text image includes a processor 302 and a memory 301. It should be noted that the components of the device 300 for removing handwritten content from a text image shown in FIG. 3 are only exemplary and not limiting, and the device 300 for removing handwritten content from a text image may also have other components according to actual application requirements. For example, the memory 301 is used for non-transitory storage of computer-readable instructions; the processor 302 is used for executing computer-readable instructions. When the computer-readable instructions are executed by the processor 302, the method for removing handwritten content from the text image according to any of the above embodiments is executed.

The device 300 for removing handwritten content from a text image provided by the embodiment of the present disclosure may be used to implement the method for removing handwritten content from a text image provided by the embodiment of the present disclosure, and the device 300 for removing handwritten content from a text image may be configured on an electronic apparatus. The electronic apparatus may be a personal computer, a mobile terminal, etc., and the mobile terminal may be a hardware device with various operating systems, such as a mobile phone, a tablet computer, and the like.

For example, as shown in FIG. 3, the device 300 for removing handwritten content from a text image may further include an image acquisition component 303. The image acquisition component 303 is used to acquire text images, for example, to acquire images of paper texts. The memory 301 may further be used to store text images; the processor 302 may further be used to read and process the text images to obtain input images. It should be noted that, the text image may be the original image described in the foregoing embodiments of the method for removing handwritten content from a text image.

For example, the image acquisition component 303 is the image acquisition device described in the embodiment of the method for removing handwritten content from the text image. For example, the image acquisition component 303 may be a camera of a smartphone, a camera of a tablet computer, a camera of a personal computer, a digital camera lenses, webcams, and other devices that may be used for capturing images.

For example, in the embodiment shown in FIG. 3, the image acquisition component 303, the memory 301, and the processor 302 may be physically integrated in the same electronic apparatus, and the image acquisition component 303 may be a camera configured on the electronic apparatus. The memory 301 and the processor 302 receive images sent from the image acquisition component 303 through an internal bus. In another example, the image acquisition component 303 and the memory 301/processor 302 may also be configured separately in physical locations, and the memory 301 and the processor 302 may be integrated in the electronic apparatus of the first user (for example, the computer, mobile phone, etc. of the first user), and the image acquisition component 303 may be integrated in the electronic apparatus of the second user (the first user and the second user are different). The electronic apparatus of the first user and the electronic apparatus of the second user may be configured separately in physical locations, and communication between the electronic apparatus of the first user and the electronic apparatus of the second user may be performed in a wired or wireless manner. That is, after the original image is captured by the image acquisition component 303 on the second user's electronic apparatus, the second user's electronic apparatus may send the original image to the first user's electronic apparatus in a wired or wireless manner. The first user's electronic apparatus receives the original image and performs subsequent processing on the original image. For example, the memory 301 and the processor 302 may also be integrated in a cloud server, and the cloud server receives the original image and processes the original image.

For example, the device 300 for removing handwritten content from a text image may further include an output device for outputting the output image. For example, the output device may include a display (e.g., an organic light emitting diode display, a liquid crystal display), a projector, and the like, which may be used to display the output image. It should be noted that the output device may further include a printer, and the printer is used to print the output image.

For example, components such as processor 302 and memory 301 may communicate through a network connection. The network may include a wireless network, a wired network, and/or any combination of wireless and wired networks. The network may include a local area network, the Internet, a telecommunication network, an Internet of Things based on the Internet and/or a telecommunication network, and/or any combination of the above networks, and the like. For example, the wired network may adopt twisted pair, coaxial cable or optical fiber transmission for communication, and the wireless network may adopt, for example, 3G/4G/5G mobile communication network, Bluetooth, Zigbee or WiFi and other communication methods. The present disclosure does not limit the type and function of the network.

For example, the processor 302 may control other components in the device 300 for removing handwritten content from text images to perform desired functions. The processor 302 may be a device with data processing capability and/or program execution capability, such as a central processing unit (CPU), a tensor processing unit (TPU), or a graphics processing unit (GPU). The central processing unit (CPU) may be X86 or ARM architecture, etc. The GPU may be individually integrated directly onto the motherboard, or built into the Northbridge chip of motherboard. GPUs may also be built into central processing units (CPUs).

For example, the memory 301 may include any combination of one or more computer program products, and computer program products may include computer-readable storage media in various forms, such as volatile memory and/or non-volatile memory. Volatile memory may include, for example, random access memory (RAM) and/or cache, and so on. Non-volatile memory may include, for example, read only memory (ROM), hard disk, erasable programmable read only memory (EPROM), portable compact disk read only memory (CD-ROM), USB memory, flash memory, and the like. One or more computer-readable instructions may be stored in the computer-readable storage medium, and the processor 302 may execute the computer-readable instructions to implement various functions of the device 300 for removing handwritten content from a text image. Various application programs, various data and the like may also be stored in the storage medium.

For a detailed description of the process of the method for removing handwritten content from a text image performed by the device 300 for removing handwritten content from a text image, reference may be made to the relevant descriptions in the embodiments of the method for removing handwritten content from a text image, and repetitions will not be incorporated.

Figure 4:
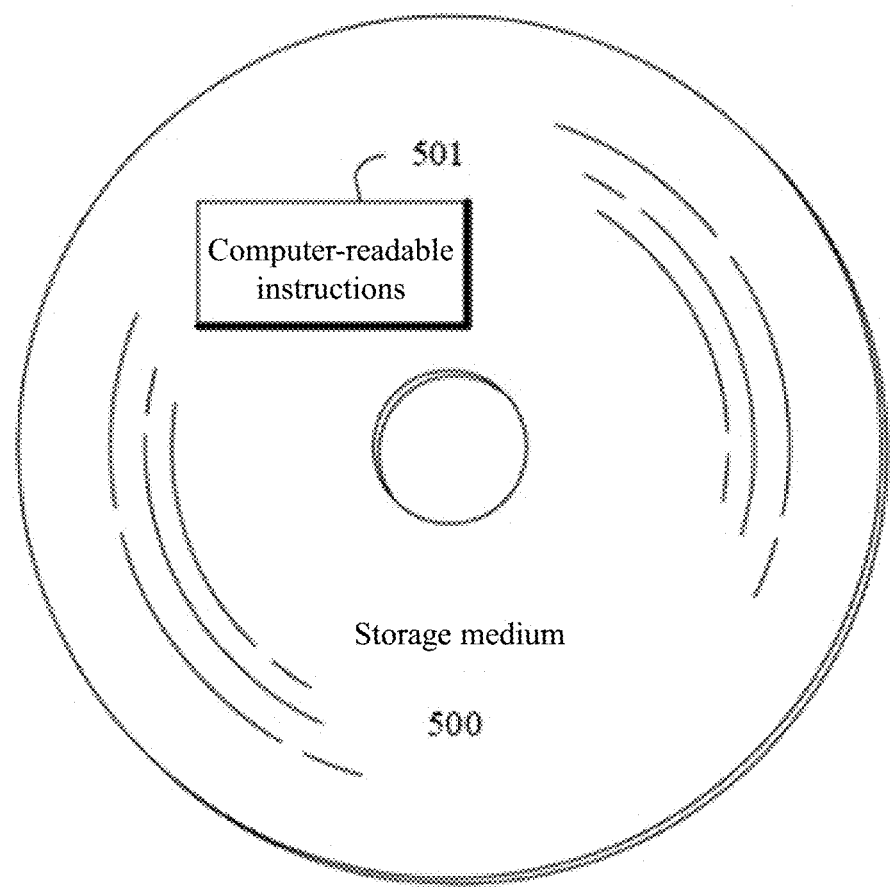
FIG. 4 is a schematic view of a storage medium according to an embodiment of the present disclosure.

At least one embodiment of the present disclosure further provides a storage medium, and FIG. 4 is a schematic view of a storage medium provided by at least one embodiment of the present disclosure. For example, as shown in FIG. 4, one or more computer-readable instructions 501 may be non-transitory stored in a storage medium 500. For example, when the computer-readable instructions 501 are executed by a computer, one or more steps in the method for removing handwritten content from a text image according to the above description may be performed.

For example, the storage medium 500 may be applied to the above-mentioned device 300 for removing handwritten content from a text image, for example, and may include the memory 301 in the device 300 for removing handwritten content from a text image.

For example, for the description of the storage medium 500, reference may be made to the description of the memory in the embodiment of the device 300 for removing handwritten content from a text image, and the repetition will not be incorporated.

Figure 5:
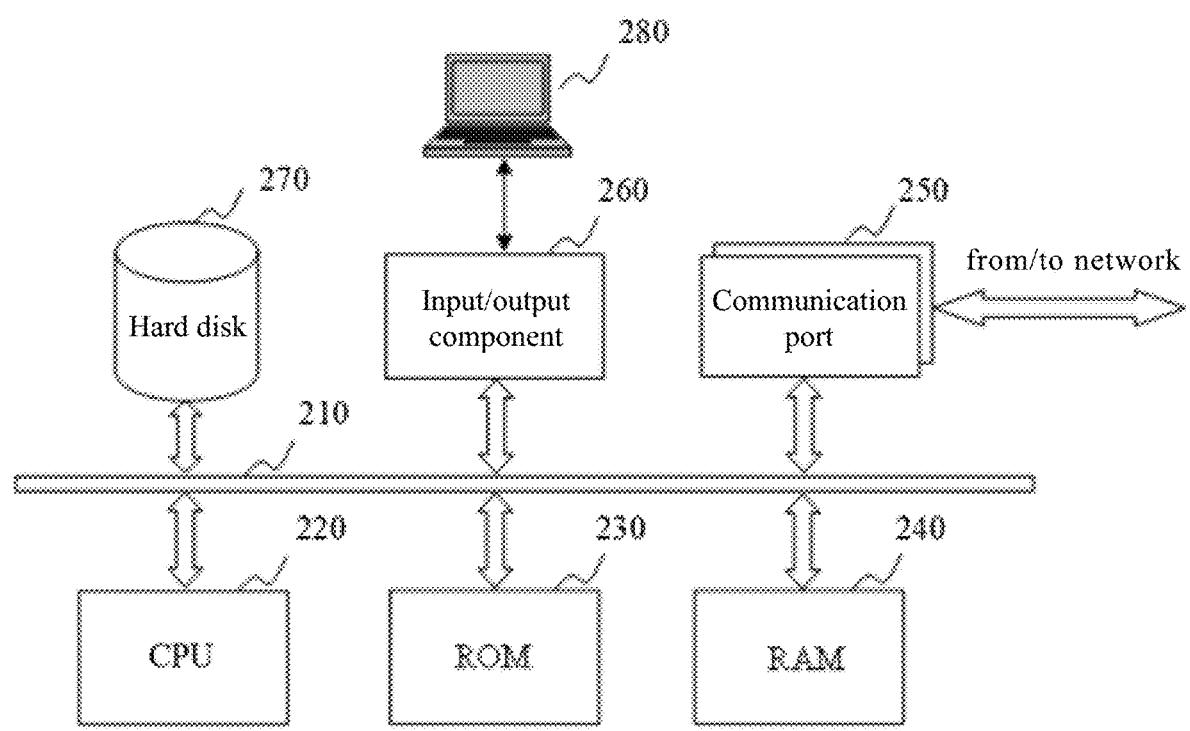
FIG. 5 is a schematic view of a hardware environment provided by an embodiment of the present disclosure.

FIG. 5 is a schematic view of a hardware environment provided by at least one embodiment of the present disclosure. The device for removing handwritten content from a text image provided by the embodiment of the present disclosure may be applied to an Internet system.

The device for removing handwritten content from a text image involved in the present disclosure may be implemented by using the computer system provided in FIG. 5. Such computer systems may include personal computers, laptops, tablets, cell phones, and any smart device. The specific system in this embodiment illustrates a hardware platform including a user interface by using a functional block diagram. Such computer system may include a general-purpose computer device, or a special-purpose computer device. Both computer devices may be used to implement the device for removing handwritten content from a text image in this embodiment. The computer system may implement any of the components that implement the information needed to implement the method for removing handwritten from text image. For example, a computer system may be implemented by a computer device through its hardware devices, software programs, firmware, and combinations thereof. For the purpose of convenience, only one computer device is shown in FIG. 5, but the related computer functions described in this embodiment to realize the information required by the method for removing handwritten content from a text image may be implemented in a distributed manner by a group of similar platforms to separate the processing load for the computer system.

As shown in FIG. 5, the computer system may include a communication port 250 to which a network enabling data communication is connected. For example, the communication port 250 may communicate with the image acquisition component 403 described above. The computer system may further include a processor group 220 (i.e., the processors described above) for executing program instructions. The processor group 220 may consist of at least one processor (e.g., a CPU). The computer system may include an internal communication bus 210. The computer system may include various forms of program storage units as well as data storage units (i.e., the memories or storage media described above), such as a hard disk 270, a read only memory (ROM) 230, a random access memory (RAM) 240, which may be used to store various data files used for computer processing and/or communication, and possible program instructions executed by the processor group 220. The computer system may further include an input/output component 260, which may support input/output data flow between the computer system and other components (e.g., user interface 280, which may be the display described above). The computer system may also send and receive information and data through the communication port 250.

In some embodiments, the computer system described above may be used to constitute a server in an Internet communication system. The server of the Internet communication system may be a server hardware device, or a server group. Each server within a server group may be connected through a wired or wireless network. A server group may be centralized, such as a data center. A server group may also be distributed, such as a distributed system.

It should be noted that each block in the block diagrams and/or flowcharts of the present disclosure, as well as combinations of blocks in the block diagrams and/or flowcharts, may be implemented by using a dedicated hardware-based system for performing the specified functions or actions, or may be implemented in a combination of special-purpose hardware and computer program instructions. It is commonly known to those skilled in the art that implementation in hardware, implementation in software, and implementation in a combination of software and hardware are all equivalent.

For the present disclosure, the following need to be explained:

(1) The accompanying drawings of the embodiments of the present disclosure only relate to the structures involved in the embodiments of the present disclosure, and other structures may refer to general designs.

(2) In the drawings for describing the embodiments of the present disclosure, the thickness and size of layers or structures are exaggerated for clarity. It will be understood that when an element such as a layer, film, region or substrate is referred to as being "on" or "under" another element, said element may be "directly on" or "under" the other element, or an intermediate element may be present therebetween.

(3) The embodiments of the present disclosure and the features in the embodiments may be combined with each other to obtain new embodiments as long as they do not conflict with each other.

The above descriptions are only specific embodiments of the present disclosure, but the scope to be protected by the present disclosure is not limited thereto, and the scope to be protected by the present disclosure should be subject to the scope of the claims.

What is claimed is:

1. A method for removing handwritten content from a text image, comprising:
    acquiring an input image of a text page to be processed, wherein the input image comprises a handwritten area, and the handwritten area comprises the handwritten content;
    using an image segmentation model to recognize the input image so as to obtain an initial handwritten pixel of the handwritten content;
    performing blurring processing on the initial handwritten pixel to obtain a handwritten pixel mask area;
    determining the handwritten content in the handwritten area according to the handwritten pixel mask area; and
    removing the handwritten content from the input image to obtain an output image;
    wherein blurring processing is performed on the initial handwritten pixel through a GaussianBlur function to expand an area of the initial handwritten pixel, thereby obtaining the handwritten pixel mask area.

2. The method for removing the handwritten content from the text image according to claim 1, wherein the step of removing the handwritten content from the input image to obtain the output image comprises:
    determining non-handwritten pixels in the handwritten pixel mask area in the input image according to a pixel value of the initial handwritten pixel and a position of the handwritten pixel mask area; removing a content of the handwritten pixel mask area from the input image to obtain an intermediate output image;
    performing non-handwritten pixel restoration in the handwritten pixel mask area on the intermediate output image to obtain the output image.

3. The method for removing the handwritten content from the text image according to claim 1, wherein the step of removing the handwritten content from the input image to obtain the output image comprises:
    determining a non-handwritten pixel in the handwritten pixel mask area in the input image according to a pixel value of the initial handwritten pixel and a position of the handwritten pixel mask area;
    removing the handwritten content from the input image according to the non-handwritten pixel in the handwritten pixel mask area and the handwritten pixel mask area to obtain the output image.

4. The method for removing the handwritten content from the text image according to claim 1, wherein the step of removing the handwritten content from the input image to obtain the output image comprises:
    segmenting and removing the handwritten content from the input image to obtain an intermediate output image;
    performing binarization processing on the intermediate output image to obtain the output image.

5. The method for removing the handwritten content from the text image according to claim 1, wherein the step of removing the handwritten content from the input image to obtain the output image comprises:
    acquiring a replacement pixel;
    replacing pixels of the handwritten content with the replacement pixel to remove the handwritten content from the input image to obtain the output image.

6. The method for removing the handwritten content from the text image according to claim 5, wherein the step of replacing the pixels of the handwritten content with the replacement pixel to remove the handwritten content from the input image to obtain the output image comprises:
    replacing the pixels of the handwritten content with the replacement pixel to remove the handwritten content from the input image to obtain an intermediate output image;
    performing binarization processing on the intermediate output image to obtain the output image.

7. The method for removing the handwritten content from the text image according to claim 5, wherein the replacement pixel are obtained according to the pixels of the handwritten content processed through an image restoration algorithm based on pixel neighborhood calculation.

8. The method for removing the handwritten content from the text image according to claim 5, wherein the step of obtaining the replacement pixel further comprises using an area recognition model to recognize the input image to obtain the handwritten area, and the replacement pixel is any one of pixels in the handwritten area except the pixels of the handwritten content; or,
    the replacement pixel is an average value of pixel values of all pixels in the handwritten area except the pixels of the handwritten content.

9. The method for removing the handwritten content from the text image according to claim 1, wherein the step of acquiring the input image of the text page to be processed comprises:
    acquiring an original image of the text page to be processed, wherein the original image comprises a text area to be processed;
    performing edge detection on the original image to determine the text area to be processed in the original image;
    performing rectification processing on the text area to be processed to obtain the input image.

10. The method for removing the handwritten content from the text image according to claim 1, wherein the image segmentation model is a pre-trained U-Net model for segmenting the input image.

11. A device for removing handwritten content from a text image, comprising:
    a memory, provided for non-transitory storage of computer-readable instructions; and
    a processor, configured to run the computer-readable instructions, wherein the computer-readable instructions are executed by the processor to execute the method for removing the handwritten content from the text image according to claim 1.

12. A storage medium, provided for non-transitory storage of computer-readable instructions, wherein when the computer-readable instructions are executed by a computer, the method for removing handwritten content from a text image according to claim 1 is able to be executed.

\* \* \* \* \*